United States Patent
Kawashima et al.

(10) Patent No.: US 8,361,673 B2
(45) Date of Patent: Jan. 29, 2013

(54) FUEL CELL AND METHOD FOR MANUFACTURING SAME

(75) Inventors: Tsutomu Kawashima, Nara (JP); Hideyo Higashino, Osaka (JP); Takashi Nakagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/131,974

(22) PCT Filed: Sep. 2, 2010

(86) PCT No.: PCT/JP2010/005398
§ 371 (c)(1),
(2), (4) Date: May 31, 2011

(87) PCT Pub. No.: WO2011/045889
PCT Pub. Date: Apr. 21, 2011

(65) Prior Publication Data
US 2011/0236792 A1    Sep. 29, 2011

(30) Foreign Application Priority Data
Oct. 13, 2009  (JP) ................................ 2009-236235

(51) Int. Cl.
*H01M 8/10* (2006.01)

(52) U.S. Cl. ........................................ 429/492; 429/491

(58) Field of Classification Search ................... 429/492
See application file for complete search history.

(56) References Cited

U.S. PATENT DOCUMENTS

| | | | |
|---|---|---|---|
| 6,037,074 A | 3/2000 | Mercuri et al. | |
| 6,566,004 B1 | 5/2003 | Fly et al. | |
| 7,033,692 B1 | 4/2006 | Otawa et al. | |
| 2004/0072055 A1 | 4/2004 | Getz et al. | |
| 2004/0157112 A1* | 8/2004 | Suzuki et al. ................... | 429/44 |
| 2005/0130023 A1* | 6/2005 | Lebowitz et al. ............... | 429/41 |
| 2005/0214630 A1 | 9/2005 | Yoshida et al. | |

FOREIGN PATENT DOCUMENTS

| | | |
|---|---|---|
| EP | 1 139 471 | 10/2001 |
| EP | 1 184 924 | 3/2002 |
| EP | 1 336 999 | 8/2003 |
| JP | 2000-123850 | 4/2000 |
| JP | 2002-203571 | 7/2002 |

(Continued)

OTHER PUBLICATIONS

International Search Report issued Dec. 7, 2010 in International (PCT) Application No. PCT/JP2010/005398.

(Continued)

*Primary Examiner* — Raymond Alejandro
*Assistant Examiner* — Gary Harris
(74) *Attorney, Agent, or Firm* — Wenderoth, Lind & Ponack, L.L.P.

(57) ABSTRACT

A fuel cell has a gas diffusion layer (15A, 15C) provided on at least one surface side of a polymer electrolyte membrane (12). The polymer electrolyte membrane is structured with a conductive carbon sheet. Fluid flow passages (16A, 16C) are formed on the surface of the gas diffusion layer (15A, 15C) contacting a separator (21A, 21C). The roughness of the surface of the gas diffusion layer (15A, 15C) provided with the fluid flow passage is smaller than the roughness of its surface contacting the catalyst layer (14A, 14C). Thus, it becomes possible to achieve a further improvement in power generation performance, and to suppress a reduction in durability.

6 Claims, 14 Drawing Sheets

FOREIGN PATENT DOCUMENTS

| | | |
|---|---|---|
| JP | 2003-36860 | 2/2003 |
| JP | 2006-4787 | 1/2006 |
| JP | 2006-339089 | 12/2006 |
| JP | 2010-205450 | 9/2010 |
| WO | 01/22509 | 3/2001 |
| WO | 02/35630 | 5/2002 |
| WO | 2005/081339 | 9/2005 |

OTHER PUBLICATIONS

Extended European Search Report issued Apr. 26, 2012 in corresponding European Application No. 10823158.

International Preliminary Report on Patentability and Written Opinion (with English translation) issued May 15, 2012 in corresponding Japanese Application No. PCT/JP2010/005398.

\* cited by examiner

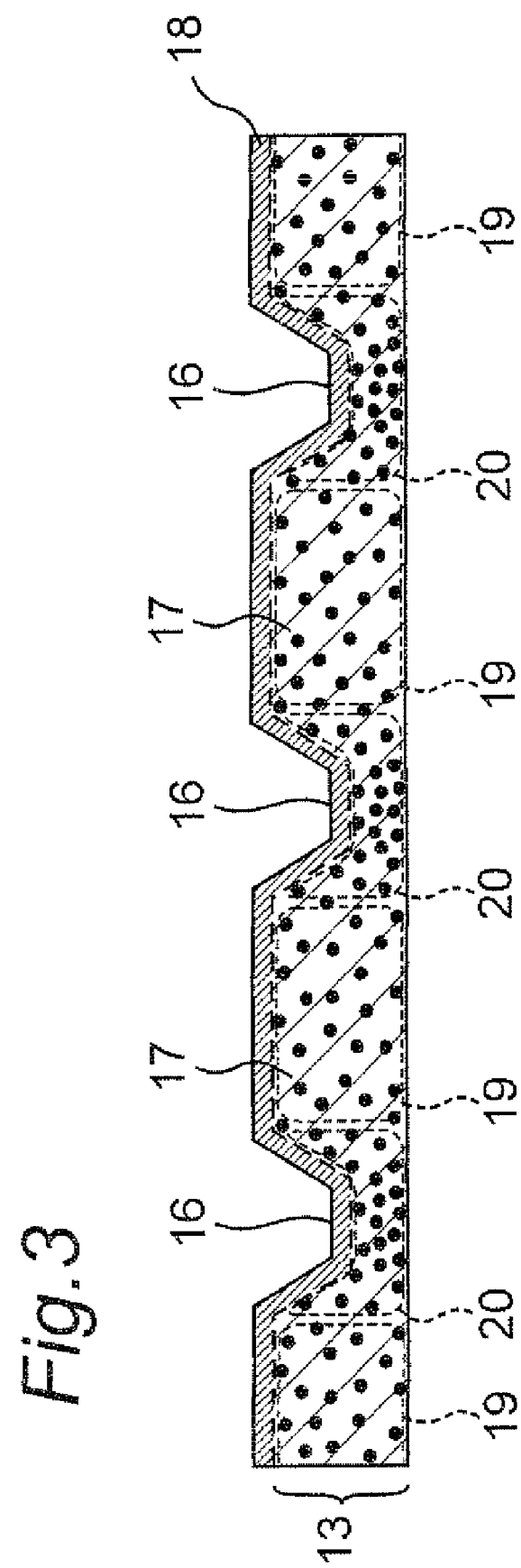

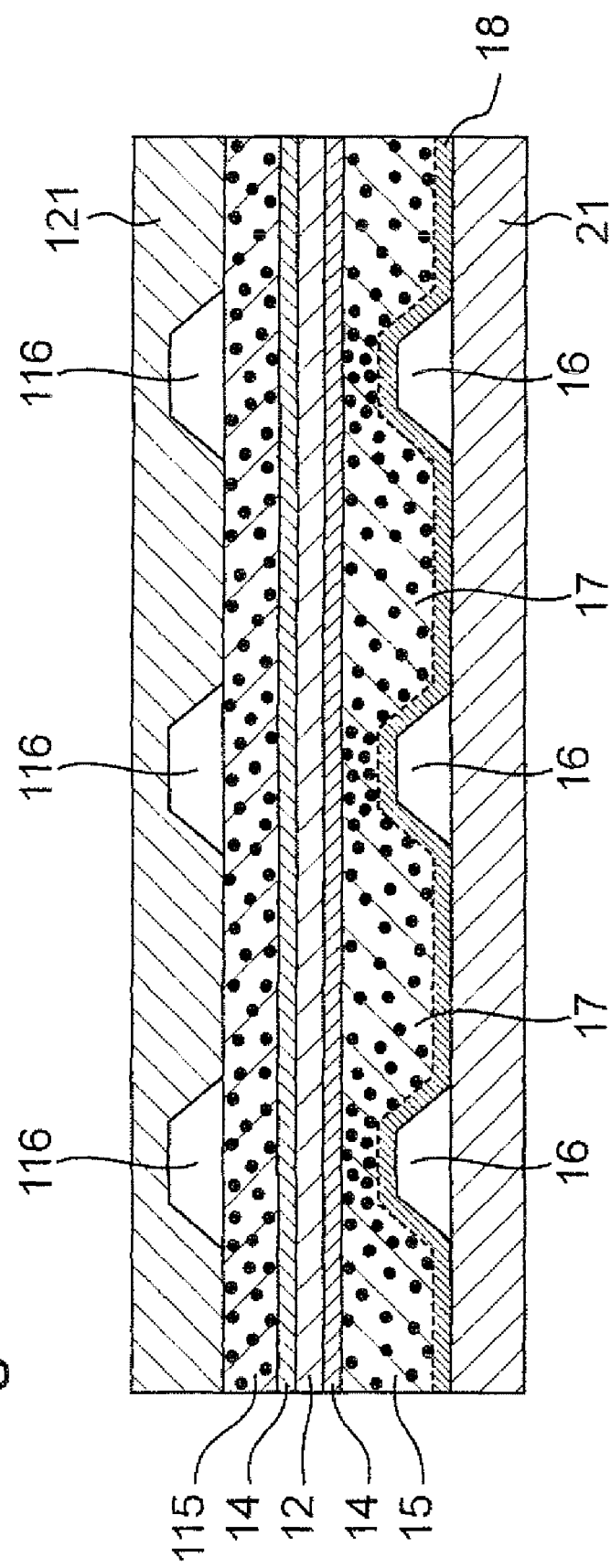

FUEL CELL AND METHOD FOR MANUFACTURING SAME

TECHNICAL FIELD

The present invention relates to a fuel cell and method for manufacturing same. In particular, the present invention relates to the structure of a gas diffusion layer included in the fuel cell.

BACKGROUND ART

A fuel cell (e.g., a polymer electrolyte fuel cell) is configured to supply a fuel gas such as hydrogen to the one face of a polymer electrolyte membrane possessing hydrogen ion conductivity, and to supply an oxidant gas such as oxygen to the other face, to cause an electrochemical reaction via the polymer electrolyte membrane, so as to electrically acquire reaction energy produced thereby.

Generally, a fuel cell is structured by stacking a plurality of cells, and fastening them under pressure with fastening members such as bolts. One cell is structured with a membrane electrode assembly (hereinafter, referred to as the MEA: Membrane-Electrode-Assembly) clamped by paired plate-like electrically conductive separators. One of the paired separators is an anode separator. The anode separator has fluid flow passages for supplying the fuel gas, which is formed on the face of the anode separator contacting on the MEA. The other one of the paired separators is a cathode separator. The cathode separator has fluid flow passages for supplying the oxidant gas, which is formed on the face of the cathode separator contacting on the MEA.

The MEA is structured with a polymer electrolyte membrane, and paired porous electrodes respectively disposed on opposite faces of the polymer electrolyte membrane. One of the paired porous electrodes is an anode electrode, and the other is a cathode electrode. The polymer electrolyte membrane and the porous electrodes are integrally joined with hot press or the like. The paired porous electrodes are each structured with a catalyst layer stacked on the polymer electrolyte membrane, and a gas diffusion layer stacked on the catalyst layer, the gas diffusion layer being porous and conductive.

When the fuel gas is introduced into the fluid flow passages of the anode separator and the oxidant gas is introduced into the fluid flow passages of the cathode separator, an electrochemical reaction takes place via the polymer electrolyte membrane. The fuel cell is structured such that the electric power generated by the electrochemical reaction is acquired externally via the separators.

In the fuel cell of such a structure, the porous electrodes are required to possess excellent conductivity, air permeability, water permeability, and corrosion resistance. Accordingly, the porous electrodes are made of, for example, graphite carbon, which possesses excellent conductivity, corrosion resistance, and water repellency. Such graphite carbon can be prepared, for example, as follows: turning the carbon fibers into a paper-form or weaving the carbon fibers, to thereby prepare a sheet possessing air permeability attributed to its structure; and thereafter, subjecting the sheet to heat treatment, to thereby improve its graphitization degree.

Further, the separators are required to possess excellent conductivity, gas impermeability, and corrosion resistance. Accordingly, as the material of the separators, for example, a conductive material made of a graphite base material, a metal base material or the like is used. When a graphite base material is used as the material of the separators, the fluid flow passages of the separators are generally formed by subjecting a mixture of graphite powder and resin to compression molding. Further, when a metal base material is used as the material of the separators, the fluid flow passages of the separators are generally formed by performing presswork of a thin plate treated to be conductive on the surface of a highly corrosion resistive material such as stainless steel, titanium or the like. It is noted that, a separator which is formed of a mixture of graphite powder and resin is disclosed, for example, in Patent Document 1 (International Publication No. WO 2002-035630). Patent Document 1 discloses a separator in which a plurality of flat graphite particles are exposed at the surface of the separator, and a resin lacking portion is formed between the plurality of flat graphite particles, for the purpose of reducing the contact resistance between the separator and the gas diffusion layer.

However, the separator using the graphite base material is low in strength, and therefore a reduction in thickness is difficult to be achieved. Therefore, it is disadvantageous in attaining a reduction in size and costs of the fuel cell. Further, the separator using metal base material is difficult to freely pattern the fluid flow passages.

As a solution for such issues, a fuel cell having the fluid flow passages disposed at a member other than the separator is disclosed in, for example, Patent Document 2 (Japanese Unexamined Patent Publication No. 2000-123850), Patent Document 3 (Japanese Unexamined Patent Publication No. 2002-203571), and Patent Document 4 (Japanese Unexamined Patent Publication No. 2006-339089).

FIG. 13 shows the structure of the fuel cell disclosed in Patent Document 2. The fuel cell of Patent Document 2 has a structure in which a catalyst layer 102, a first carbon sheet 103, a second carbon sheet 104, and a separator 105 are stacked in order on each face of a polymer electrolyte membrane 101. The second carbon sheet 104 is cut into a pattern shape of a fluid flow passage 106, to structure a gas diffusion layer with the first carbon sheet 103. That is, in the fuel cell of the Patent Document 2, the fluid flow passage 106 is secured by disposing the second carbon sheet 104 between the separator 105 and the first carbon sheet 103.

FIG. 14 shows the structure of the fuel cell disclosed in Patent Document 3. The fuel cell of Patent Document 3 has a structure in which a porous electrode 202 and a separator 203 are stacked in order on each face of a polymer electrolyte membrane 201. Each porous electrode 202 is structured by weaving carbon fibers of a low degree of crystal orientation and a great surface area into a sheet 205 made of carbon fibers of a high degree of crystal orientation and a small surface area, to form sidewall portions 206 of fluid flow passages 204. That is, in the fuel cell of Patent Document 3, each fluid flow passage 204 is formed at the porous electrode 202 serving as the gas diffusion layer. Further, in the fuel cell of Patent Document 3, the gas diffusion layer is structured to possess both the water repellency and water retentivity, by causing the carbon fibers structuring the bottom face of the fluid flow passage 204 and the carbon fibers structuring the side face of the fluid flow passage 204 to be different from each other in pore density.

FIG. 15A shows the structure of the fuel cell disclosed in Patent Document 4. The fuel cell of Patent Document 4 has a structure in which a catalyst layer 302, a gas diffusion layer 303, and a separator 304 are stacked in order on each face of a polymer electrolyte membrane 301. FIG. 15B is a cross-sectional view showing the structure of the gas diffusion layer 303. The gas diffusion layer 303 is structured by stacking a water-repellent layer 305 provided on the polymer electrolyte membrane 301 side, and a gas flow passage layer 307, the gas flow passage layer 307 having fluid flow passages 306 formed inside its body formed by a porous body. That is, in the fuel cell of Patent Document 4, the gas diffusion layer 303 is prepared as a two-layer structure made up of a water-repellent layer 305 and a gas flow passage layer 307, such that the fluid flow passages 306 are formed inside the gas diffusion layer 303.

PRIOR ART DOCUMENTS

Patent Documents

Patent Document 1: International Publication No. WO 2002-035630
Patent Document 2: Japanese Unexamined Patent Publication No. 2000-123850
Patent Document 3: Japanese Unexamined Patent Publication No. 2002-203571
Patent Document 4: Japanese Unexamined Patent Publication No. 2006-339089

SUMMARY OF THE INVENTION

Subject to be Solved by the Invention

However, with the fuel cell of the Patent Document 2, because the second carbon sheet 104 cut into the pattern shape of the fluid flow passage 106 is disposed between the first carbon sheet 103 and the separator 105, the contacting portion between the members becomes greater than that of the conventional fuel cell. Accordingly, there is an issue that the increased contact resistance results in a voltage loss. In particular, when fastening the cells of a fuel cell having such a structure with a small fastening force, an increase in the contact resistance is significant. Further, when the cells are fastened, while a surface pressure is applied to the contacting portion of the second carbon sheet 104 relative to the first carbon sheet 103, no surface pressure is applied to the fluid flow passage portion. Accordingly, it is difficult to reduce the contact resistance occurring at the interface between the first carbon sheet 103 and the catalyst layer 102 positioned below the fluid flow passage 106 (on the polymer electrolyte membrane 101 side). Accordingly, with the fuel cell of Patent Document 2, it is difficult to improve the power generation performance.

Further, with the fuel cell of Patent Document 3, because highly hydrophilic carbon fibers are used as carbon fibers structuring the side faces of the fluid flow passages 204, the gas diffusibility of the side faces of the fluid flow passages 204 is low. Therefore, at a portion of the catalyst layer positioned below the rib portion 206 between adjacent ones of the fluid flow passages 204 and 204, the supply amount of the reactant gas (the fuel gas or the oxidant gas) is reduced. Accordingly, particularly when high gas utilization is set, it poses an issue that the difference in gas diffusibility between the portion of the catalyst layer positioned below the rib portion 206 and the other portion becomes significant, which in turn causes a voltage drop. Accordingly, with the fuel cell of Patent Document 3 also, it is difficult to improve the power generation performance.

Still further, with the fuel cell of Patent Document 4, because the gas diffusion layer has the two-layer structure similarly to Patent Document 2, the contacting portion between the members becomes greater than that in the conventional fuel cell. This poses a problem of an increase in contact resistance, which invites a voltage loss. Further, when the cells are fastened, because the surface pressure is little applied to the portion of the water-repellent layer 305 positioned below the fluid flow passages 306, it is difficult to reduce the contact resistance occurring at the interface between that portion of the water-repellent layer 305 and the catalyst layer 302. Accordingly, with the fuel cell of Patent Document 4, it is difficult to improve the power generation performance. Further, when the fuel cell generates electric power, the reactant gas, the water vapor and the like flow through the fluid flow passages 306 at a flow velocity of some m/sec. Therefore, the surface of the porous body forming the fluid flow passages 306 may peel off in the gas flow passage layer 307 of Patent Document 4. Occurrence of such peeling impairs the durability of the fuel cell.

Accordingly an object of the present invention is to solve the issues described above, and to provide a fuel cell with which an improvement in power generation performance and a reduction in durability can be achieved, and to provide a method for manufacturing same.

Means for Solving the Subject

The inventors of the present invention have devoted themselves to solving the issues that the conventional techniques face, to find the following.

That is, using a conductive carbon sheet as the material of the gas diffusion layer, and forming fluid flow passages at the sheet by pressing a pressing member conforming to the shape of the fluid flow passages against the sheet, the surface layer portion of the sheet on the fluid flow passages side becomes higher in density than the inner portion of the sheet. For example, in a case where the conductive carbon sheet contains carbon fibers, because the surface layer portion of the sheet becomes higher in density than the inner portion, the carbon fibers are entangled each other, to be a layer of different property. As used herein, this surface layer portion is referred to as a skin layer. The inventors of the present invention found that the skin layer is effective in suppressing the peeling issue. Further, the inventors of the present invention found that: by providing no skin layer at the surface of the sheet contacting on the catalyst layer, so as to increase the surface roughness, the carbon particles inside the conductive carbon sheet are exposed to mesh with the surface of the catalyst layer; which reduces the contact resistance. Accordingly, based on such findings, the inventors of the present invention have arrived at the present invention.

According to a first aspect of the present invention, there is provided a fuel cell, comprising:
a polymer electrolyte membrane having a catalyst layer, a gas diffusion layer, and a separator stacked in order on each of both surfaces of the polymer electrolyte membrane, wherein
the gas diffusion layer provided at least on one surface side of the polymer electrolyte membrane is structured with a conductive carbon sheet, fluid flow passages being formed on a surface of the gas diffusion layer contacting on the separator, and a roughness of the surface of the gas diffusion layer having the fluid flow passage formed is smaller than a roughness of a surface of the gas diffusion layer contacting on the catalyst layer.

According to a second aspect of the present invention, there is provided the fuel cell according to the first aspect, wherein a difference in an arithmetic mean deviation of roughness profile between the surface of the gas diffusion layer contacting on the separator and the surface of the gas diffusion layer contacting on the catalyst layer is 0.1 μm or more and 4.95 μm or less.

According to a third aspect of the present invention, there is provided the fuel cell according to the first aspect, wherein a difference in an arithmetic mean deviation of roughness profile between the surface of the gas diffusion layer contacting on the separator and the surface of the gas diffusion layer abutting on the catalyst layer is 1.0 μm or more and 4.95 μm or less.

According to a fourth aspect of the present invention, there is provided the fuel cell according to the first aspect, wherein an arithmetic mean deviation of roughness profile of the surface of the gas diffusion layer contacting on the separator is 0.05 μm or more and 1.0 μm or less, and an arithmetic mean deviation of roughness profile of the surface of the gas diffusion layer contacting on the catalyst layer is 1.0 μm or more and 5.0 μm or less.

According to a fifth aspect of the present invention, there is provided the fuel cell according to the first aspect, wherein a density of a region below a rib portion positioned between adjacent ones of the fluid flow passages of the gas diffusion layer is smaller than a density of a region below each of the fluid flow passages.

According to a sixth aspect of the present invention, there is provided the fuel cell according to the first aspect, wherein the conductive carbon sheet is structured with at least one of carbon black, graphite, expanded graphite, and carbon fibers, and a fluorine-base resin.

According to a seventh aspect of the present invention, there is provided the fuel cell according to the sixth aspect, wherein the fluorine-base resin is polytetrafluoroethylene.

According to an eighth aspect of the present invention, there is provided a method for manufacturing of a fuel cell using a gas diffusion layer having a fluid flow passage formed on a surface of the gas diffusion layer contacting on a separator, comprising:

disposing a stacked product made up of a conductive carbon sheet and a resin sheet between a pressing member having a projecting portion conforming to a shape of the fluid flow passage and a receiving member;

pressing the stacked product by the pressing member and the receiving member, to form the fluid flow passage at a surface of the conductive carbon sheet; and peeling off the resin sheet from the conductive carbon sheet having the fluid flow passage formed, to produce a gas diffusion layer.

Effects of the Invention

With the fuel cell according to the present invention, because the roughness of the surface of the gas diffusion layer where the fluid flow passages are formed is set to be small, such peeling issue can be suppressed, and a reduction in durability can be suppressed. Further, because the roughness of the surface of the gas diffusion layer contacting on the catalyst layer is set to be great, that surface meshes with the surface of the catalyst layer. This makes it possible to reduce the contact resistance. Accordingly, a further improvement in the power generation performance can be achieved. Further, because such a structure does not require an increase in the constituents, nor does it require formation of the fluid flow passages at the separator, a reduction in costs of the fuel cell can be achieved.

BRIEF DESCRIPTION OF THE DRAWINGS

These and other objects and features of the present invention will become clear from the following description taken in conjunction with the preferred embodiments thereof with reference to the accompanying drawings, in which:

FIG. 3 is a cross-sectional view schematically showing the structure of a gas diffusion layer included in the fuel cell shown in FIG. 1;

FIG. 5 is a cross-sectional view schematically showing a first variation of the fuel cell according to the present invention;

MODE FOR CARRYING OUT THE INVENTION

Before proceeding to the description of the present invention, it is noted that identical reference symbols are allotted to the same components throughout the accompanying drawings.

In the following, with reference to the drawings, a description will be given of an embodiment of the present invention.

Embodiment

Figure 1:
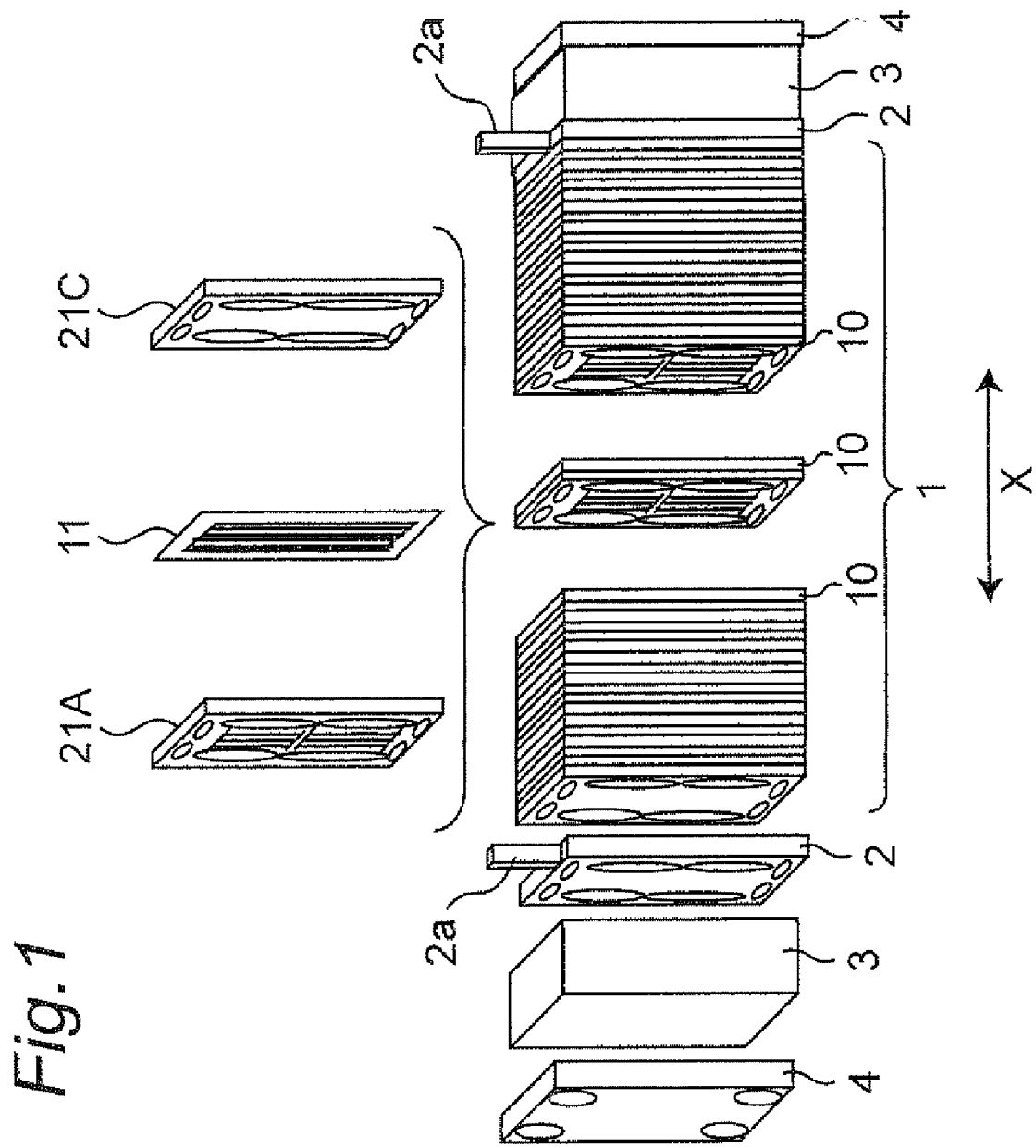
FIG. 1 is an exploded perspective view schematically showing the basic structure of a fuel cell according to an embodiment of the present invention.

With reference to FIG. 1, a description will be given of the schematic structure of a fuel cell according to the embodiment of the present invention. FIG. 1 is an exploded perspective view schematically showing the basic structure of the fuel cell according to the embodiment of the present invention. The fuel cell according to the present embodiment is a polymer electrolyte fuel cell that allows a fuel gas containing hydrogen and an oxidant gas containing oxygen such as air to electrochemically react with each other, such that electric power and heat are produced at the same time.

The fuel cell according to the present embodiment is structured by clamping both the end portions in a stacked direction X of a cell stacked product 1 made up of stacked cells 10 each being a unit cell by the paired end plates 4 and 4 each having a collector plate 2 and an insulating plate 3 interposed, and by fastening them with a fastening member (not shown) under pressure in the stacked direction X.

The cell 10 has a membrane electrode assembly 11 (hereinafter referred to as the MEA) and paired plate-like conductive separators disposed on opposite faces of the MEA 11, respectively. One of the paired separators is an anode separator 21A, and the other is a cathode separator 21C. The anode separator 21A and the cathode separator 21C are each structured with a carbon-base or metallic flat plate, for example.

The collector plate 2 functions to guide the current generated by the cell 10 to the outside. The collector plate 2 is structured with a gas impermeable and conductive material, for example, copper, brass or the like. The collector plate 2 is provided with a current acquiring terminal portion 2a which projects in the direction perpendicular to the stacked direction X, for establishing a connection with an external line. The insulating plate 3 is structured with an electrically insulating resin, for example, a fluorine-base resin, a PPS resin or the like. The end plate 4 is structured with a metal material of high rigidity, such as steel.

Figure 2:
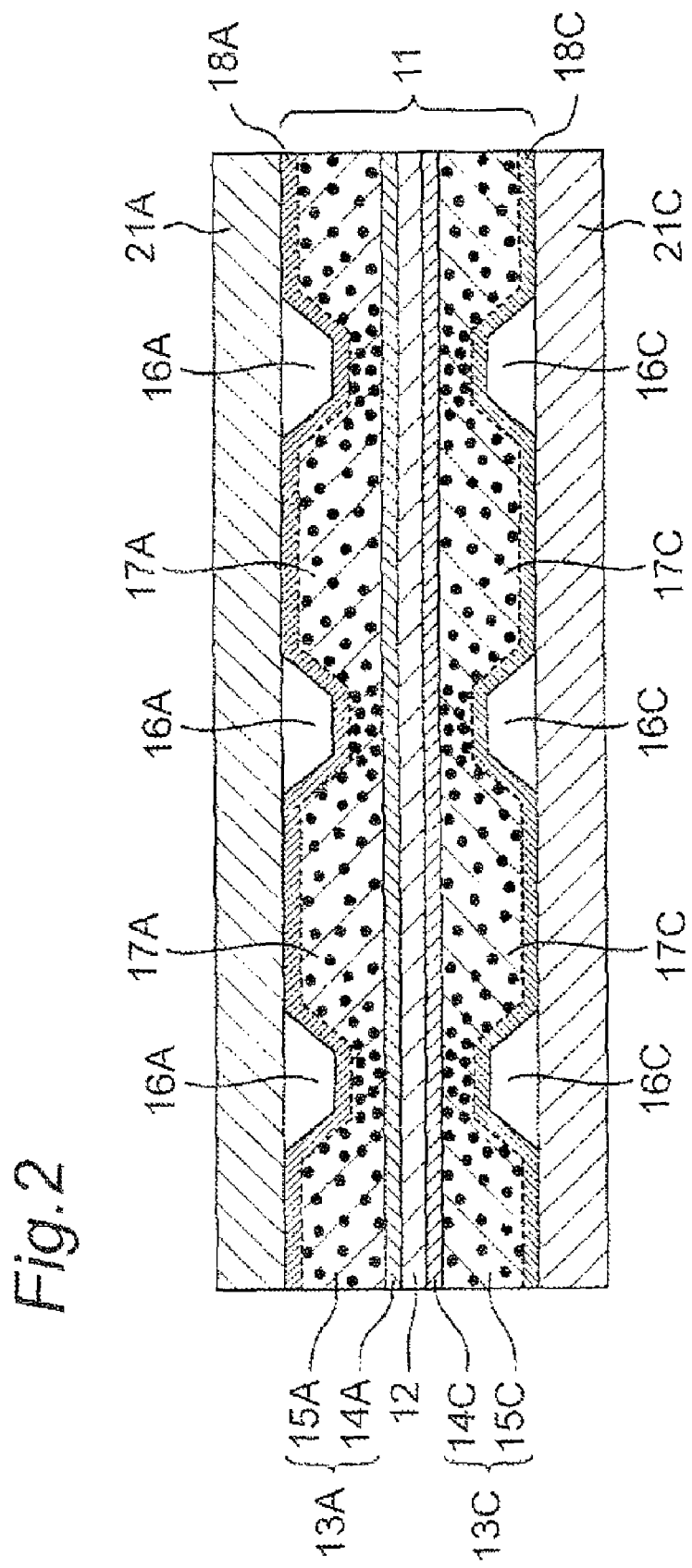
FIG. 2 is a cross-sectional view schematically showing the structure of an MEA included in the fuel cell shown in FIG. 1.

Next, with reference to FIG. 2, a description will be given of the structure of the MEA 11. FIG. 2 is a cross-sectional view schematically showing the structure of the MEA according to the present embodiment.

The MEA 11 has a polymer electrolyte membrane 12 having hydrogen ion conductivity, and electrode layers being the paired porous electrodes respectively formed on the opposite faces of the polymer electrolyte membrane 12. One of the paired electrode layers is an anode electrode 13A, and the other is a cathode electrode 13C. The anode electrode 13A is provided on one surface of the polymer electrolyte membrane 12, and has an anode catalyst layer (simply referred to as the catalyst layer also) 14A, and an anode gas diffusion layer (simply referred to as the gas diffusion layer also) 15A which has gas permeability and conductivity and is provided on the outer side of the anode catalyst layer 14A. Similarly, the cathode electrode 13C is provided on the other surface of the polymer electrolyte membrane 12, and has a cathode catalyst layer (simply referred to as the catalyst layer also) 14C, and a cathode gas diffusion layer (simply referred to as the gas diffusion layer also) 15C which has gas permeability and electrical conductivity and is provided on the outer side of the cathode catalyst layer 14C.

In the following, unless otherwise distinction between the anode side and the cathode side is required, e.g., so long as any member on the anode side and any member on the cathode side are similarly structured, the indication for distinguishing between them is omitted. For example, when a description is given of a matter common to the anode gas diffusion layer 15A and the cathode gas diffusion layer 15C, it is simply stated as the gas diffusion layer 15.

The gas diffusion layer 15 is structured with a conductive carbon sheet which is a mixture of a carbon-base material and a fluorine-base resin. As the carbon-base material, at least one material out of acetylene black, artificial graphite, natural graphite, expanded graphite, and carbon fibers can be used. As the fluorine-base resin, PTFE (polytetrafluoroethylene), PFA (tetrafluoroethylene-perfluoroalkyl vinyl ether copolymer), FEP (tetrafluoroethylene-hexafluoropropylene copolymer), ETFE (tetrafluoroethylene-ethylene copolymer) or the like can be used. Of these, preferably PTFE is used as the fluorine-base resin. PTFE has such an action to become fibrous to bond carbon particles to each other.

The proportion of the carbon-base material in the gas diffusion layer 15 to the total weight is 60 wt % or more and 95 wt % or less, and preferably, 70 wt % or more and 90 wt % or less. When the proportion of the carbon-base material becomes 60 wt % or less, the resistance of the gas diffusion layer 15 becomes higher. On the other hand, when the proportion of the carbon-base material becomes 95 wt % or more, the strength of the gas diffusion layer 15 becomes weak.

The porosity of the gas diffusion layer 15 can be selected to attain the best porosity in a range of 30% or more to 90% or less, depending on the power generation condition of the fuel cell. It is noted that the porosity of the cathode gas diffusion layer 15C is preferably greater than the porosity of the anode gas diffusion layer 15A. For example, when the power generation condition of the fuel cell is set such that: the cell temperature is 70° C.; the anode dew point and the cathode dew point are 60° C.; the fuel gas utilization (Uf) is 70%; and the oxidant gas utilization (Uo) is 50%, it is preferable that the porosity of the anode gas diffusion layer 15A is 30% or more and 60% or less; and the porosity of the cathode gas diffusion layer 15C is 60% or more and 90% or less. The reason is as follows.

That is, the oxidant gas (e.g., air) diffused by the cathode gas diffusion layer 15C is poor in gas diffusibility than the fuel gas (e.g., hydrogen) diffused by the anode gas diffusion layer 15A. Accordingly, the cathode gas diffusion layer 15C is required to have high gas diffusibility as compared to the anode gas diffusion layer 15A. Further, the fuel cell generates power by an electrochemical reaction of hydrogen and oxygen, which generates water. At this time, the water generated on the anode electrode 13A side shifts with proton toward the cathode electrode 13C side. Consequently, the water which is present near the polymer electrolyte membrane 12 on the anode electrode 13A side is reduced, whereby the polymer electrolyte membrane 12 becomes dry and the power generation performance may be reduced. In order to suppress such an issue, it is effective to reduce the porosity of the anode gas diffusion layer 15A to confine the water around the polymer electrolyte membrane 12.

At the surface on the separator 21A side of the anode gas diffusion layer 15A, fuel gas flow passages (referred to as the fluid flow passages also) 16A for supplying the fuel gas are formed. A rib portion 17A positioned between adjacent ones of the fuel gas flow passages 16A and 16A of the anode gas diffusion layer 15A is electrically connected to the separator 21A by being contacting on the surface thereof. The fuel gas flows through the fuel gas flow passages 16A and diffuses into the anode catalyst layer 14A. As will be described later, the fuel gas flow passages 16A are formed by pressing a mold, which is one example of a pressing member that conforms to the shape of the fuel gas flow passages 16A, against the conductive carbon sheet. At the surface layer portion of the anode gas diffusion layer 15A on the separator 21A side, a skin layer 18A which is higher in density than the inner portion of the gas diffusion layer 15A is formed. When the fuel cell generates power, the fuel gas, water vapor and the like flow through the fuel gas flow passages 16A at a flow velocity of some m/sec. With the fuel cell of the present embodiment, because the skin layer 18A which is high in density is formed, it becomes possible to suppress the surface of the anode gas diffusion layer 15A from peeling off, which may otherwise be caused by the surface of the anode gas diffusion layer 15A being brought into contact with the fuel gas, water vapor and the like. This makes it possible to suppress a reduction in durability of the fuel cell, and to achieve the durability at a level of tens of thousands of hours, for example.

The surface of the anode gas diffusion layer 15A on the catalyst layer 14A side is electrically connected to the catalyst layer 14A, by being contacting thereon substantially entirely. Further, the surface of the anode gas diffusion layer 15A on the separator 21A side is formed to be smaller in surface roughness than the surface on the catalyst layer 14A side. Though it is not particularly limited, for example, such a structure can be implemented by applying a pressure to the anode gas diffusion layer 15A in the thickness direction, to form skin layers respectively on both the surface layer portions of the gas diffusion layer 15A, and thereafter, removing only the skin layer on the catalyst layer 14A side. With this structure, the surface of the anode gas diffusion layer 15A on the catalyst layer 14A side being great in surface roughness meshes with the surface of the catalyst layer 14A. This makes it possible to suppress the contact resistance at the interface between the gas diffusion layer 15A and the catalyst layer 14A. Accordingly, high power generation performance can be achieved.

The cathode gas diffusion layer 15C is similarly structured with the anode gas diffusion layer 15A. At the surface of the cathode gas diffusion layer 15C on the separator 21C side, oxidant gas flow passages 16C for supplying the oxidant gas such as oxygen are formed. A rib portion 17C positioned between adjacent ones of the oxidant gas flow passages 16C and 16C of the cathode gas diffusion layer 15C is electrically connected to the separator 21C by being contacting on the surface thereof. The oxidant gas flows through the oxidant gas flow passages 16C and diffuses into the catalyst layer 14C. As will be described later, the oxidant gas flow passages 16C are formed by pressing a mold, which is one example of a pressing member that conforms to the shape of the oxidant gas flow passages 16C, against the conductive carbon sheet. At the surface layer portion of the cathode gas diffusion layer 15C on the separator 21C side, a skin layer 18C which is higher in density than the inner portion of the cathode gas diffusion layer 15C is formed. When the fuel cell generates power, the oxidant gas, water vapor and the like flow through the oxidant gas flow passages 16C at a flow velocity of some m/sec. With the fuel cell of the present embodiment, because the skin layer 18C which is high in density is formed, it becomes possible to suppress the surface of the cathode gas diffusion layer 15C from peeling off, which may otherwise be caused by the surface of the cathode gas diffusion layer 15C being brought into contact with the oxidant gas, water vapor and the like. This makes it possible to suppress a reduction in durability of the fuel cell, and to achieve the durability at a level of tens of thousands of hours, for example.

The surface of the cathode gas diffusion layer 15C on the catalyst layer 14C side is electrically connected to the catalyst layer 14C, by being contacting thereon substantially entirely. Further, the surface of the cathode gas diffusion layer 15C on the separator 21C side is formed to be smaller in surface roughness than the surface on the catalyst layer 14C side. Though it is not particularly limited, for example, such a structure can be implemented by applying a pressure to the cathode gas diffusion layer 15C in the thickness direction, to form the skin layers respectively on both the surface layer portions of the gas diffusion layer 15C, and thereafter, removing only the skin layer on the catalyst layer 14C side. With this structure, the surface of the cathode gas diffusion layer 15C on the catalyst layer 14C being great in surface roughness meshes with the surface of the catalyst layer 14C. This makes it possible to suppress the contact resistance at the interface between the gas diffusion layer 15C and the catalyst layer 14C. Accordingly, high power generation performance can be achieved.

It is noted that, preferably, the arithmetic mean deviation of roughness profile $Sa_1$ of the surface of the gas diffusion layer 15 on the separator 21 side is 0.05 µm or more and 1.0 µm or less. When the fluid flow passages 16 are formed using the mold, the surface roughness of the mold is transferred to the surface of the gas diffusion layer 15 just it is. Consequently, it is difficult to reduce the arithmetic mean deviation of roughness profile $Sa_1$ to be smaller than 0.05 µm. Further, the arithmetic mean deviation of roughness profile $Sa_1$ greater than 1.0 µm impairs separability from the mold. This imposes difficulty in manufacturing.

On the other hand, the arithmetic mean deviation of roughness profile $Sa_e$ of the surface of the gas diffusion layer 15 on the catalyst layer 14 side is preferably 1.0 µm or more and 5.0 µm or less. When the arithmetic mean deviation of roughness profile $Sa_2$ is smaller than 1.0 µm, because the contacting area relative to the catalyst layer 14 cannot be increased, the contact resistance cannot be reduced. Further, when the arithmetic mean deviation of roughness profile $Sa_2$ is greater than 5.0 µm, the gas diffusion layer 15 may penetrate through the catalyst layer 14, to damage the polymer electrolyte membrane 12. Consequently, the durability of the fuel cell may possibly be impaired.

Further, preferably, the difference in the arithmetic mean deviation of roughness profile ($Sa_1$-$Sa_2$) between the surface of the gas diffusion layer 15 on the separator 21 side and the surface of the gas diffusion layer 15 on the catalyst layer 14 side is 0.1 µm or more. Thus, it becomes possible to improve the power generation performance and to suppress a reduction in durability more surely than with a conventional gas diffusion layer which is manufactured without an intention of providing such a difference in surface roughness. It is noted that, more preferably, the difference in the arithmetic mean deviation of roughness profile is 1.0 µm or more. In this case, it becomes possible to improve the power generation performance and to suppress a reduction in durability still more surely than the conventional gas diffusion layer. Further, preferably, the difference in the arithmetic mean deviation of roughness profile is 4.95 µm or less. Here, the difference in the arithmetic mean deviation of roughness profile greater than 4.95 μm occurs when the arithmetic mean deviation of roughness profile $Sa_2$ of the surface of the gas diffusion layer 15 on the catalyst layer 14 side is greater than 5.0 μm. Accordingly, by setting the difference in the arithmetic mean deviation of roughness profile to be 4.95 μm or less, the durability of the fuel cell can be maintained.

Further, as shown in FIG. 3, the density in each rib-below region 19 of the gas diffusion layer 15 is smaller than that in each flow passage below-region 20. It is noted that, a plurality of black dots shown in FIGS. 2 and 3 are for the sake of convenience to represent the difference in density.

The reactant gas, water vapor and the like flowing through the fluid flow passages 16 flow from the sidewall portions of each of the fluid flow passages 16 through the rib-below regions 19, or flow from the bottom portion of each of the fluid flow passages 16 through the flow passage below-regions 20, to diffuse into the catalyst layer 14. At this time, because the reactant gas that flows through the rib-below region 19 to diffuse into the catalyst layer 14 is longer in the diffusion distance than the reactant gas that flows through the flow passage below-region 20 to diffuse into the catalyst layer 14, normally, the gas diffusibility is reduced. In contrast, in the present embodiment, because the density in the rib-below region 19 is smaller than that in the flow passage below-region 20, the gas diffusibility of the reactant gas flowing through the rib-below region 19 to diffuse into the catalyst layer 14 can be improved. On the other hand, though the density in the flow passage below-region 20 is greater than that in the rib-below region 19, the distance from the fluid flow passage 16 to the catalyst layer 14 is short in the flow passage below-region 20. Therefore, a reduction in gas diffusibility of the reactant gas flowing through the flow passage below-region 20 to diffuse into the catalyst layer 14 can be suppressed. As a result, the reactant gas arrives at the catalyst layer 14 in its entirety and more evenly, which makes it possible to suppress the voltage loss, to thereby improve the power generation performance. It is noted that, with such a structure, it becomes possible to reduce a reduction in the voltage loss attributed to a reduction in gas diffusibility particularly on the cathode side.

Next, with reference to FIGS. 4A to 4E, a description will be given of a method for manufacturing of the gas diffusion layer 15. FIGS. 4A to 4E are each an explanatory diagram schematically showing the method for manufacturing of the gas diffusion layer 15.

Figure 4A:
FIG. 4A is an explanatory diagram schematically showing a method for manufacturing of the gas diffusion layer included in the fuel cell shown in FIG. 1.

First, as shown in FIG. 4A, a conductive carbon sheet 31 is disposed on the resin sheet 32. As the resin sheet 32, for example, an olefin-base film such as PET, fluorine resin, PP and the like can be used.

Figure 4B:
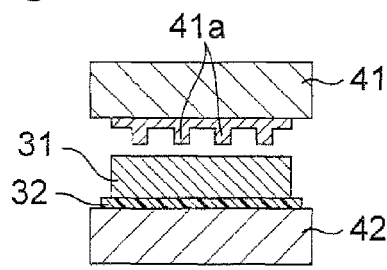
FIG. 4B is an explanatory diagram showing a step following FIG. 4A.

Next, as shown in FIG. 4B, a stacked product made up of a conductive carbon sheet 31 and a resin sheet 32 is disposed between a first mold 41 which is one example of a pressing member and a second mold 42 which is one example of a receiving member. The first mold 41 is provided with projecting portions 41a conforming to the shape of the fluid flow passages 16. The surface of the second mold 42 opposing to the projecting portions 41a of the first mold 41 is formed flat.

Figure 4C:
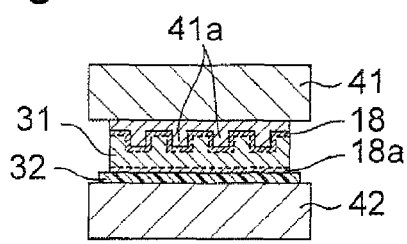
FIG. 4C is an explanatory diagram showing a step following FIG. 4B.

Next, as shown in FIG. 4C, the first mold 41 and the second mold 42 are closed, and the stacked product made up of the conductive carbon sheet 31 and the resin sheet 32 is pressed at a prescribed fastening force. Thus, the fluid flow passages 16 are formed at the surface of the conductive carbon sheet 31 on the first mold 41 side, and the skin layer 18 is formed at the surface layer portion of the conductive carbon sheet 31 on the first mold 41 side. Further, at this time, the skin layer 18a is also formed at the surface layer portion of the conductive carbon sheet 31 on the resin sheet 32 side.

Figure 4D:
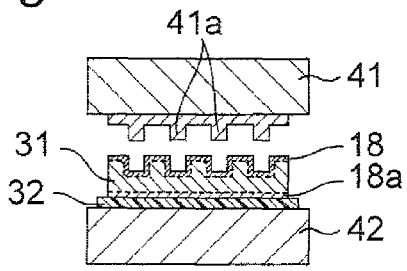
FIG. 4D is an explanatory diagram showing a step following FIG. 4C.

Next, as shown in FIG. 4D, the first mold 41 and the second mold 42 are separated from each other.

Figure 4E:
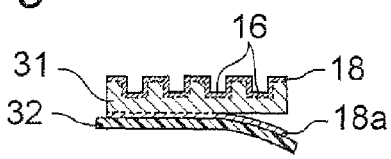
FIG. 4E is an explanatory diagram showing a step following FIG. 4D.

Next, as shown in FIG. 4E, the resin sheet 32 is peeled off from the conductive carbon sheet 31 provided with the fluid flow passages 16. At this time, the skin layer 18a is removed together with the resin sheet 32, and the roughness of the surface of the conductive carbon sheet 31 on the resin sheet 32 side becomes greater than the roughness of the surface on the first mold 41 side. In other words, the roughness of the surface of the conductive carbon sheet 31 on the first mold 41 side becomes smaller than the roughness of the surface on the resin sheet 32 side. Thus, the gas diffusion layer 15 is manufactured.

With the fuel cell according to the embodiment of the present invention, because the small roughness of the surface of the gas diffusion layer 15 where the fluid flow passages 16 are formed is achieved, it becomes possible to suppress the issue of peeling, and a reduction in durability can be suppressed. Further, because the great roughness of the surface of the gas diffusion layer 15 contacting on the catalyst layer 14 is achieved, that surface meshes with the surface of the catalyst layer 14. This makes it possible to reduce the contact resistance. Accordingly, a further improvement in power generation performance can be achieved. Further, because the structure described above does not require an increase in the constituent members, nor does it require formation of the fluid flow passages 16 at the separator 21, a reduction in costs of the fuel cell can be achieved.

It is noted that, the present invention described above is not limited to the embodiment described above, and can be carried out in a variety of other modes. For example, in the foregoing, the gas diffusion layer 15 having the skin layer 18 is used for both the anode gas diffusion layer and the cathode gas diffusion layer. However, the present invention is not limited thereto. That is, as shown in FIG. 5, it is also possible to use a gas diffusion layer 115 of the conventional structure, in which the gas diffusion layer 15 having the skin layer 18 is used for one of the anode gas diffusion layer and the cathode gas diffusion layer, and the other layer is not provided with the fluid flow passages. In this case also, a further improvement in power generation performance and suppression of a reduction in durability can be achieved. It is noted that, in this case, fluid flow passages 116 must be formed at a separator 121 contacting on the gas diffusion layer 115.

Further, as described above, in the case where the gas diffusion layer 15 having the skin layer 18 is used for one of the anode gas diffusion layer and the cathode gas diffusion layer, it is preferable to use the gas diffusion layer 15 for the cathode side. The reason is as follows.

As shown in FIG. 5, in the case where the fluid flow passages 116 are formed in a separator 122, the distance from the fluid flow passages to the catalyst layer below the rib portion becomes longer than the case where the fluid flow passages 16 are formed at the gas diffusion layer 15. This hinders the reactant gas flowing through the fluid flow passages from arriving at the catalyst layer below the rib portion, and the power generation efficiency is reduced. In the case where the reactant gas flowing through the fluid flow passages 116 is the fuel gas (e.g., hydrogen), power generation efficiency is little reduced because the gas diffusibility is excellent. In contrast thereto, in a case where the reactant gas flowing through the fluid flow passages 116 is the oxidant gas (e.g., oxygen), a reduction in power generation efficiency is great because the gas diffusibility is poor. Accordingly, use of the gas diffusion layer 15 having the skin layer 18 on the cathode side can prevent the power generation performance from being impaired.

Figure 6:
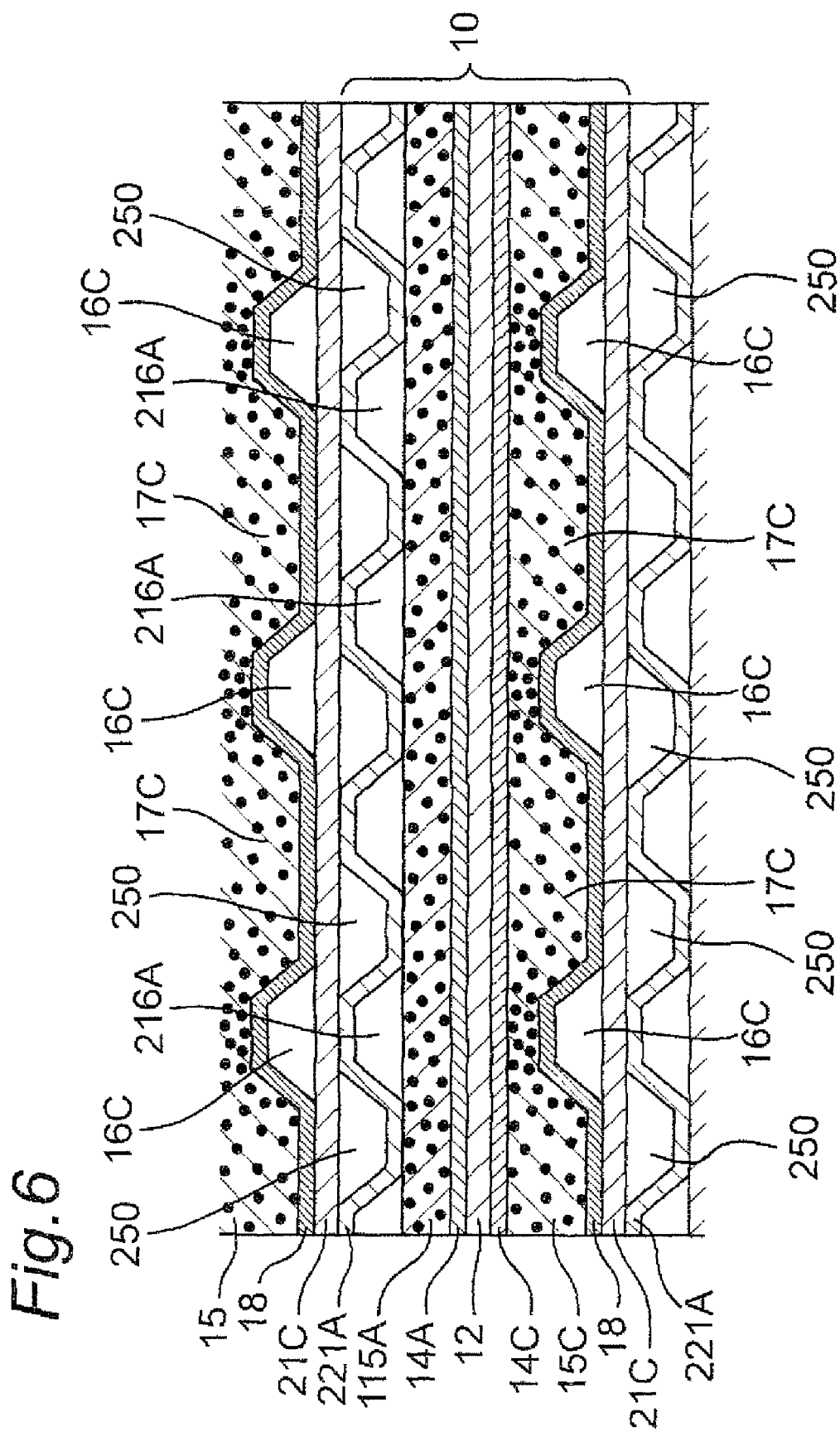
FIG. 6 is a cross-sectional view schematically showing a second variation of the fuel cell according to the embodiment of the present invention.

Further, as the separator, there is a demand for employing a separator made of metal as much as possible, from the viewpoint of a reduction in size and costs and the like. However, a separator made of metal such as stainless steel is poor in workability as compared to the separator made of carbon or the like. Therefore, it is not easy to form the fluid flow passages as the separator 121 shown in FIG. 5. Further, though it has not been described in the foregoing, generally, coolant flow passages for allowing coolant to flow are formed at least one of the paired separators. Therefore, it is difficult to use a flat plate-like separator made of metal on both the anode side and the cathode side. Accordingly, as shown in FIG. 6, what is proposed is the structure in which an anode separator 221A is formed wavy plate-like. With this structure, it becomes possible to form fuel gas flow passages 216A between an anode gas diffusion layer 115A and the anode separator 221A, and to form coolant flow passages 250 between the cathode separator 21C and the anode separator 221A. That is, with the simple work of bending the separator made of metal to be wavy plate-like, both the flow passages of the fuel gas flow passage 216A and the coolant flow passage 250 can be formed. Further, as the cathode separator 21C, a flat plate-like separator made of metal can be used.

Figure 7:
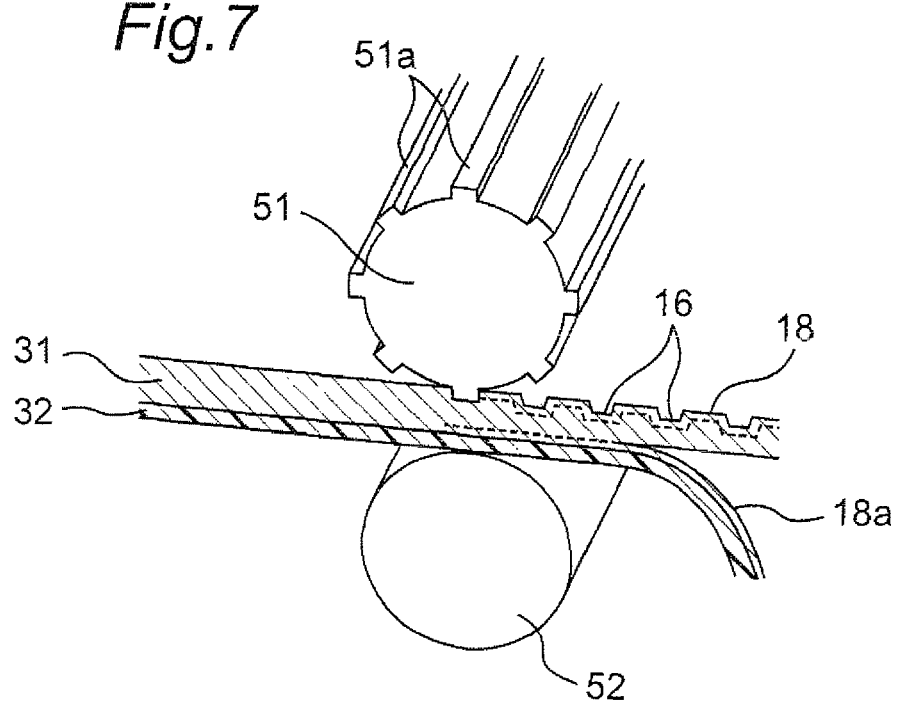
FIG. 7 is an explanatory diagram schematically showing a first variation of the method for manufacturing of the gas diffusion layer included in the fuel cell shown in FIG. 1.

Further, in the foregoing description, the fluid flow passages 16 and the skin layer 18 are formed at each gas diffusion layer 15 using the first and second molds 41 and 42. However, the present invention is not limited thereto. For example, as shown in FIG. 7, it is also possible to use a first roller 51, which is one example of a pressing member, provided in its axial direction with a plurality of ridge portions 51a conforming to the shape of the fluid flow passages 16 on its cylindrical columnar body surface, and a second roller 52, which is one example of a cylindrical columnar receiving member. In this case, by feeding the stacked product made up of the conductive carbon sheet 31 and the resin sheet 32 between the first roller 51 and the second roller 52, the fluid flow passages 16 and the skin layers 18 and 18a can be formed on the conductive carbon sheet 31. Thereafter, by peeling off the resin sheet 32 from the conductive carbon sheet 31 provided with the fluid flow passages 16, to remove the skin layer 18a, the gas diffusion layer 15 according to the present embodiment can be manufactured.

Figure 8:
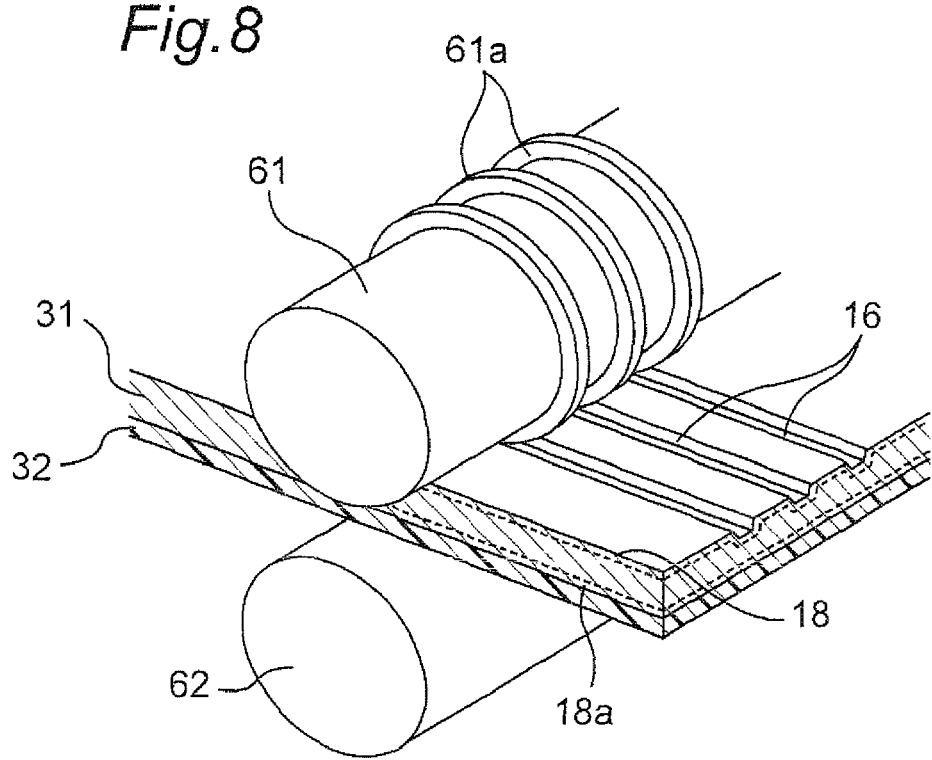
FIG. 8 is an explanatory diagram schematically showing a second variation of the method for manufacturing of the gas diffusion layer included in the fuel cell shown in FIG. 1.

Further, as shown in FIG. 8, it is also possible to use a first roller 61, which is one example of a pressing member, provided about its axis with a plurality of ridge portions 61a conforming to the shape of the fluid flow passages 16 on its cylindrical columnar body surface, and a second roller 62, which is one example of a cylindrical columnar receiving member. In this case, by feeding the stacked product made up of the conductive carbon sheet 31 and the resin sheet 32 between the first roller 61 and the second roller 62, the fluid flow passages 16 and the skin layers 18 and 18a can be formed on the conductive carbon sheet 31. Thereafter, by peeling off the resin sheet 32 from the conductive carbon sheet 31 provided with the fluid flow passages 16, to remove the skin layer 18a, the gas diffusion layer 15 according to the present embodiment can be manufactured.

Further, in the foregoing description, the skin layers 18 and 18a are respectively formed on both the surface layer portions of the conductive carbon sheet 31 by the fastening force of the first and second molds 41 and 42. However, the present invention is not limited thereto. The conductive carbon sheet 31 is formed to have a prescribed thickness by being rolled by a roller, for example. Accordingly, the skin layers 18 and 18a may previously be formed on both the surface layer portions of the conductive carbon sheet 31 by the rolling force of the roller. Further, it is also possible to use both the rolling force of the roller and the fastening force of the first and second molds 41 and 42 such that the skin layers 18 and 18a are respectively formed on both the surface layer portions of the conductive carbon sheet 31. That is, by the rolling force of the roller, after skin layers lower in density than the skin layers 18 and 18a are formed, the skin layers 18 and 18a may be formed by the fastening force of the first and second molds 41 and 42.

Further, the MEA 11 structured as described above can be applied not only to the polymer electrolyte fuel cell but also to a direct methanol fuel cell. In this case, fluid of liquid such as methanol flows through the fluid flow passages 16 formed at the gas diffusion layer 15.

Example

In the following, a description will be given of the gas diffusion layer according to an example of the present invention.

The gas diffusion layer according to the present example is manufactured as follows.

First, as the carbon-base material, acetylene black (available from DENKI KAGAKU KOGYO KABUSHIKI KAISHA: average particle size 35 μm) 50 wt %, artificial graphite (available from SEC Carbon, Ltd.: SGP grade, average particle size 30 μm) 30 wt %, and PTFE dispersion (available from Daikin Industries, Ltd.) 20 wt % are agitated by a mixer for 30 minutes, to prepare ink.

Subsequently, the prepared ink is rolled by a roller, to prepare a conductive carbon sheet having a thickness of 800 μm.

Subsequently, the prepared conductive carbon sheet is cut to have a diameter of 80 mm×80 mm, and disposed on a Teflon (registered trademark) sheet having a thickness of 50 μm.

Subsequently, a stacked product made up of the conductive carbon sheet and the Teflon (registered trademark) sheet is disposed between the first mold and the second mold. The first and second molds are structured to have an outer diameter of 120 mm×120 mm, to yield a molded product in a shape of 60 mm×60 mm. Further, the first mold has projecting portions having a height of 0.5 mm for forming the fluid flow passages.

Subsequently, the first and second molds are heated on the hot plate of a molding machine (hot press machine: type NSF-100, available from SHINTO Metal Industries Corporation) to 150° C., and thereafter, closed by a closing force of 30 ton.

Subsequently, the first and second molds are opened, and removed from the hot plate of the molding machine.

Subsequently, the Teflon (registered trademark) sheet is peeled off from the stacked product made up of the conductive carbon sheet and the Teflon (registered trademark) sheet molded by the first and second molds. Thereafter, warp correction is carried out at the surface pressure of 0.1 kgf/cm² for 20 minutes. Thus, a gas diffusion layer including the fluid flow passages is prepared.

Subsequently, a description will be given of the analysis result of the surface property of a surface provided with the fluid flow passages (hereinafter referred to as the fluid flow passage surface) and of the surface resulted from peeling off the Teflon (registered trademark) sheet (hereinafter referred to as the peeled surface) in the gas diffusion layer prepared as described above.

TABLE 1

|  | peeled surface | fluid flow passage surface |
|---|---|---|
| Sa (arithmetic mean deviation of roughness profile) | 1.33 μm | 0.22 μm |
| St (maximum roughness) | 10.16 μm | 2.13 μm |
| Sku (kurtosis of surface height distribution) | 3.03 | 3.31 |
| specific surface area (horizontal surface ratio) | 112.8% | 100.8% |

Figure 9A:
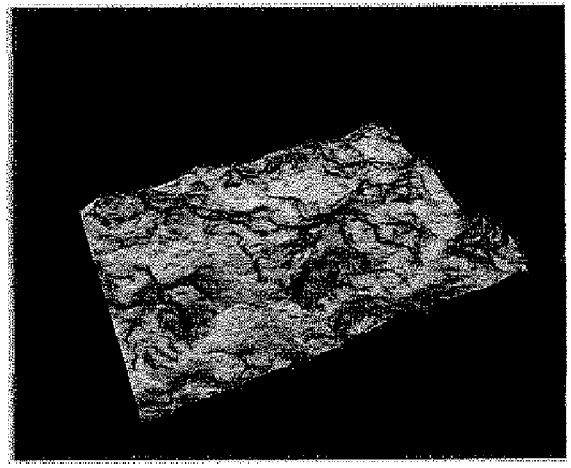
FIG. 9A is a diagram showing a measurement result, which is obtained by using a three-dimensional SEM, of the surface roughness of a peeled surface of the gas diffusion layer according to an example of the present invention.
Figure 9B:
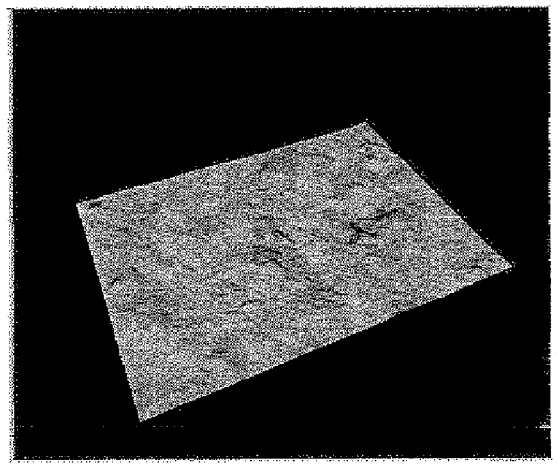
FIG. 9B is a diagram showing a measurement result, which is obtained by using a three-dimensional SEM, of the surface roughness of a fluid flow passage surface of the gas diffusion layer according to the example of the present invention.

Table 1 shows the measurement result of the surface roughness of the peeled surface and that of the fluid flow passage surface of the gas diffusion layer according to the present example obtained by using a three-dimensional SEM (ERA-8800: available from ELIONIX INC.). FIG. 9A shows the measurement result of the surface roughness of the peeled surface of the gas diffusion layer according to the present embodiment using the three-dimensional SEM. FIG. 9B shows the measurement result of the surface roughness of the fluid flow passage surface of the gas diffusion layer according to the present example obtained by using the three-dimensional SEM.

From Table 1 and FIG. 9, it can be seen that the peeled surface is greater in surface roughness and in specific surface area as compared to the fluid flow passage surface.

Figure 10A:
FIG. 10A is a surface SEM picture of the peeled surface of the gas diffusion layer according to the example of the present invention.
Figure 10B:
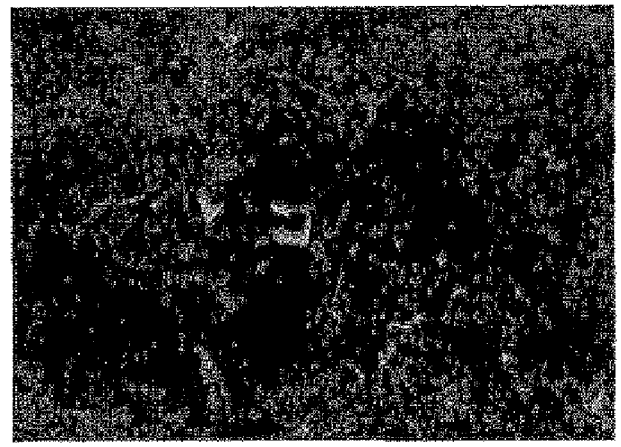
FIG. 10B is a surface SEM picture of the fluid flow passage surface of the gas diffusion layer according to the example of the present invention.

FIG. 10A is a surface SEM picture (ERA-8800, 3000 magnifications: available from ELIONIX INC.) of the peeled surface of the gas diffusion layer according to the present embodiment. FIG. 10B is a surface SEM picture (ERA-8800, 3000 magnifications: available from ELIONIX INC.) of the fluid flow passage surface of the gas diffusion layer according to the present example.

From FIG. 10A, it can be seen that the skin layer of high density in which carbon, fluorine-base resin or the like is packed is removed from the peeled surface, and carbon particles are exposed in places. Further, from FIG. 10B, it can be seen that the skin layer of high density is formed by the carbon or fluorine-base resin on the surface being packed on the fluid flow passage surface.

Figure 11A:
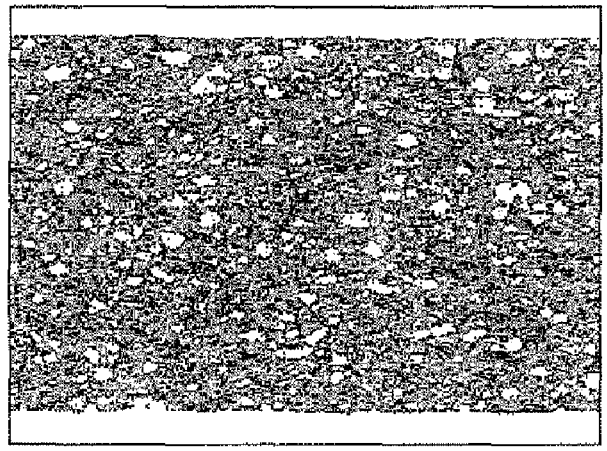
FIG. 11A is a diagram showing a mapping result, which is obtained by using an EPMA, of a fluorine concentration distribution of a cross section of a rib-below region of the gas diffusion layer according to the example of the present invention, in which the rib-below region is filled with epoxy resin and polished.
Figure 11B:
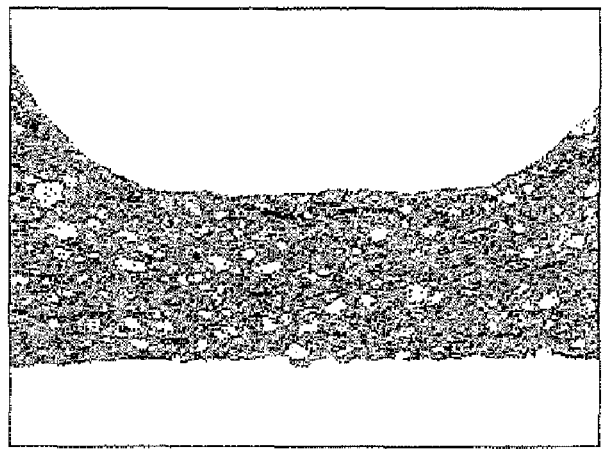
FIG. 11B is a diagram showing a mapping result, which is obtained by using an EPMA, of a fluorine concentration distribution of a cross section of a flow passage below-region of the gas diffusion layer according to the example of the present invention, in which the flow passage below-region is filled with epoxy resin and polished.

FIG. 11A shows the mapping result, which is obtained by using an electron probe micro analyzer (JXA-8900: available from JEOL Ltd., which is hereinafter referred to as EPMA), of the fluorine concentration distribution of the cross section of the rib-below region of the gas diffusion layer according to the present example, in which the rib-below region is filled with epoxy resin and polished. FIG. 11B shows the mapping result, which is obtained by using the EPMA, of the fluorine concentration distribution of the cross section of the flow passage below-region of the gas diffusion layer according to the present embodiment, in which the flow passage below-region is filled with epoxy resin and polished. FIGS. 11A and 11B show that the higher the gray-scale density is, the higher the fluorine concentration is.

From FIGS. 11A and 11B, it can be seen that the flow passage below-region is higher in fluorine concentration than the rib-below region. That is, it can be seen that the flow passage below-region is pressed harder by the first and second molds and results in such a higher concentration as compared to the rib-below region.

Next, a description will be given of the demonstration result as to whether or not the contact resistance reduces in the gas diffusion layer according to the present example.

Figure 12:
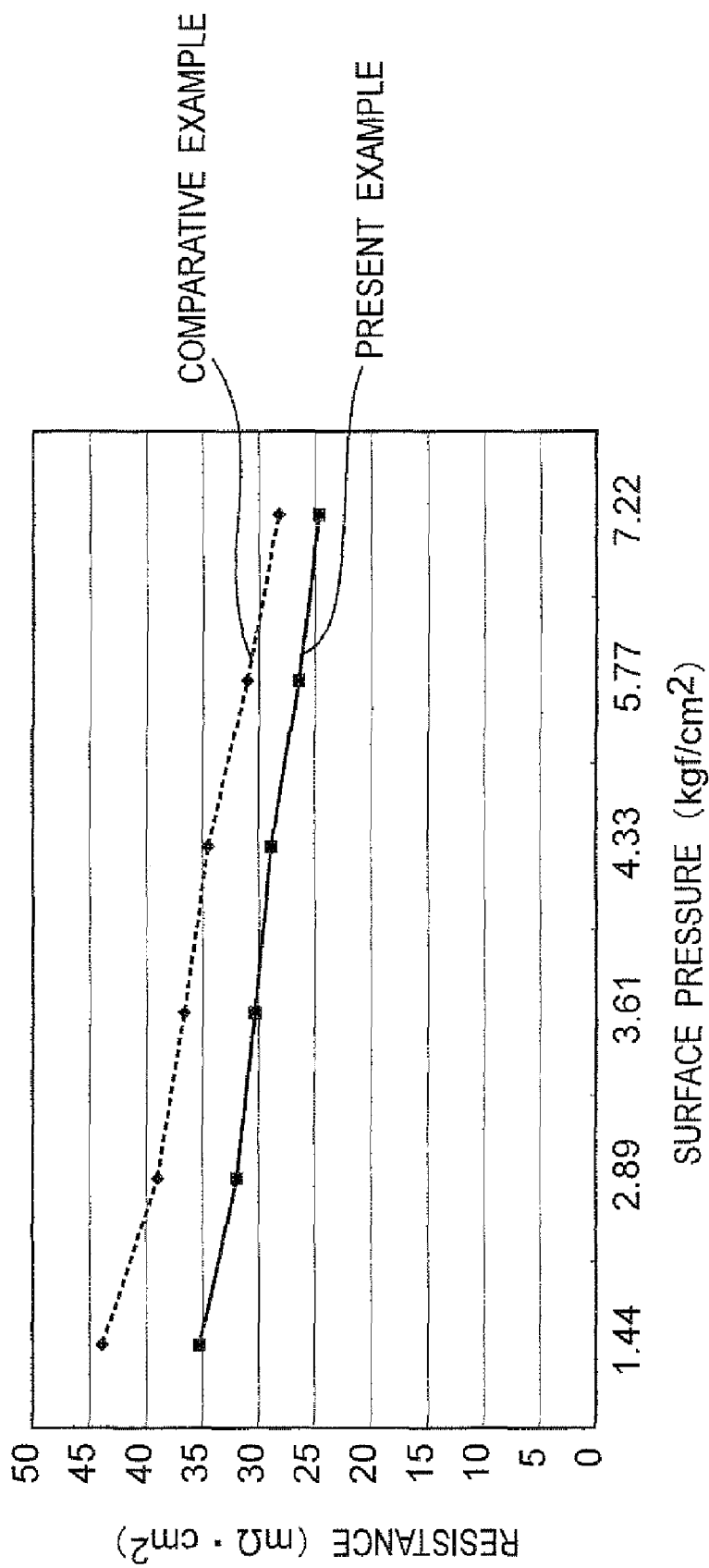
FIG. 12 is a graph showing the relationship, when the gas diffusion layer according to the present example or that according to a comparative example is clamped between paired current collector plates, between the resistance value of the collector plates and the surface pressure of the collector plates.
Figure 13:
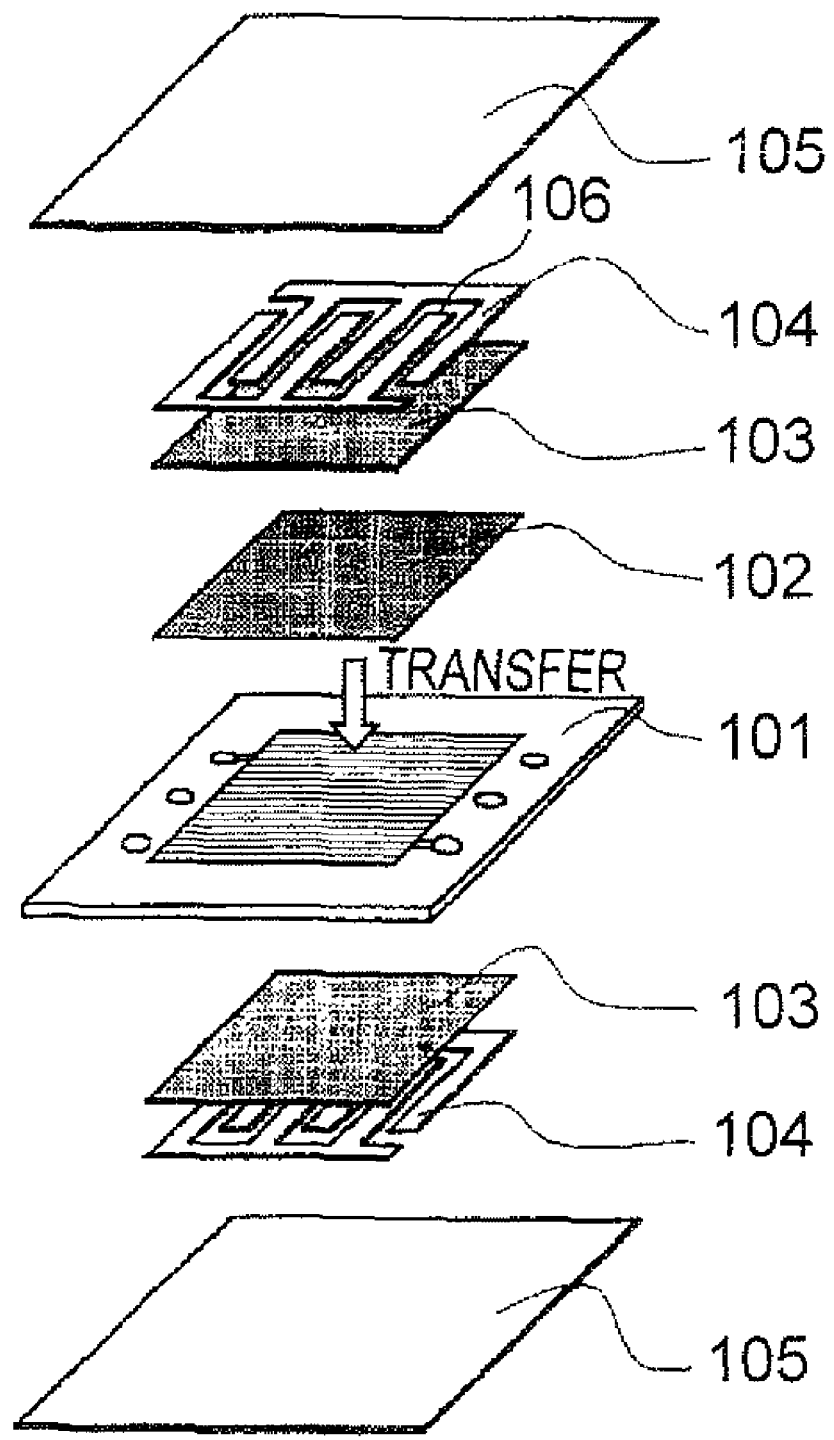
FIG. 13 is an exploded perspective view showing the structure of the fuel cell of Patent Document 2.
Figure 14:
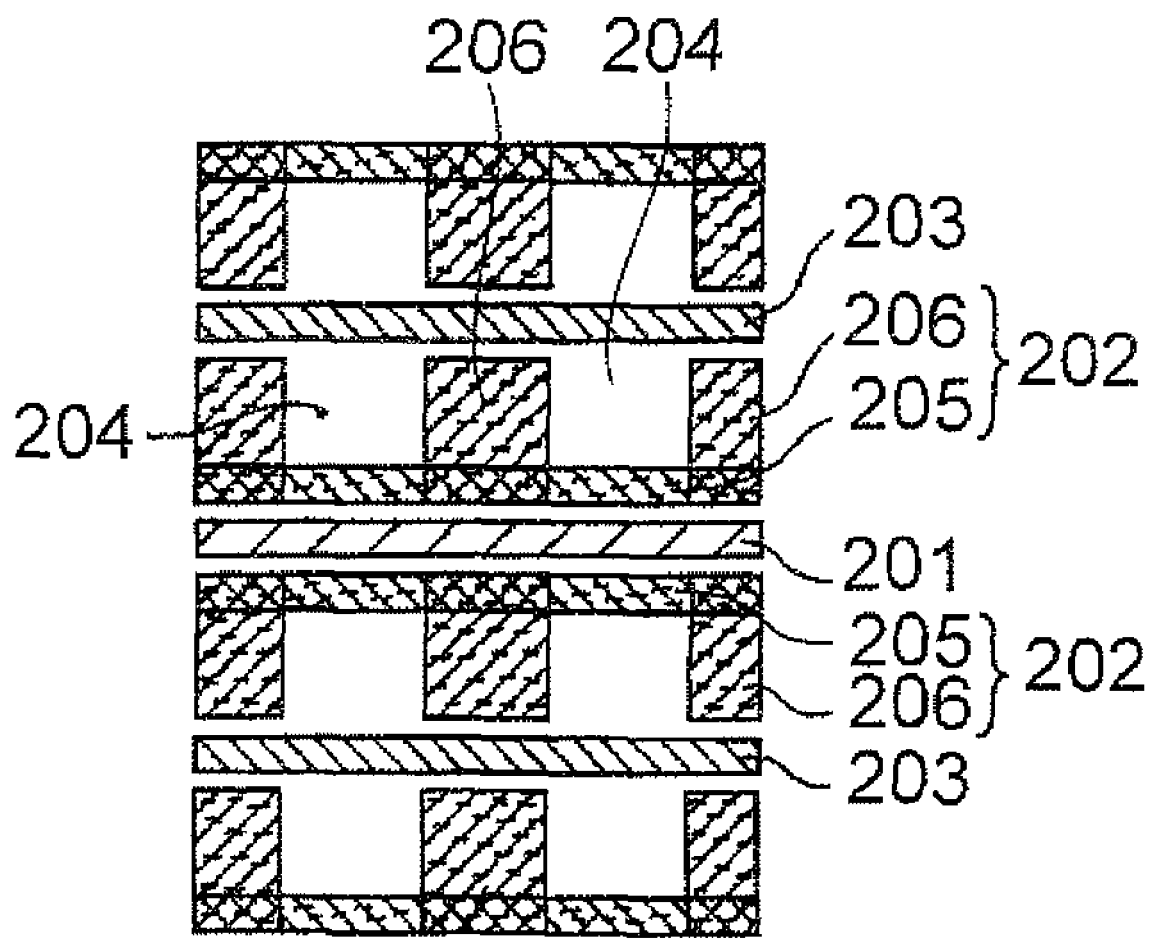
FIG. 14 is an exploded cross-sectional view showing the structure of the fuel cell of Patent Document 3.
Figure 15A:
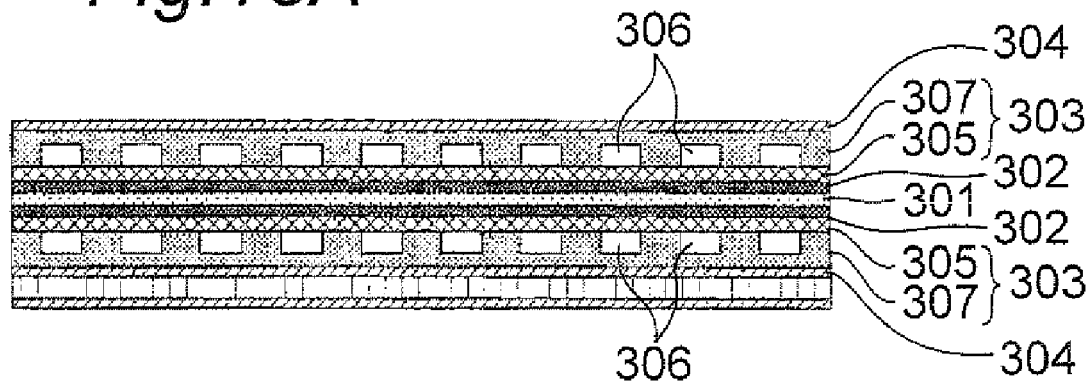
FIG. 15A is a cross-sectional view showing the fuel cell of Patent Document 4.
Figure 15B:
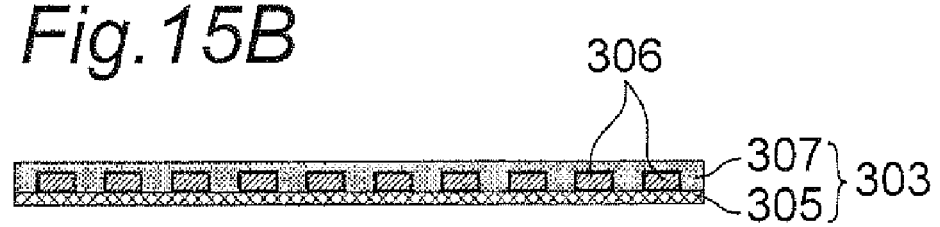
FIG. 15B is a cross-sectional view showing the gas diffusion layer of the fuel cell of Patent Document 4.

Here, as a comparative example, a gas diffusion layer whose skin layer on the peeled surface side is not peeled off and left as it is was prepared, to perform comparison as to the contact resistance. Further, the measurement of the contact resistance was carried out by clamping the gas diffusion layer according to the present example or that according to the comparative example by paired current collector plates made of gold-plated brass, to measure the resistance value between the collector plates. FIG. 12 is a graph showing a transition of the resistance values between the collector plates when the surface pressure of the collector plates is changed. In FIG. 12, the solid line represents a transition of the resistance value of the gas diffusion layer according to the present example, and the dotted line represents a transition of the resistance value of the gas diffusion layer according to the comparative example.

From FIG. 12, it can be seen that the gas diffusion layer according to the present example exhibits a lower resistance value at every surface pressure, as compared to the gas diffusion layer according to the comparative example. In particular, when the surface pressure is lower, the greater difference in resistance value is shown. Therefore, with the fuel cell including the gas diffusion layer according to the present example, it becomes possible to suppress an increase in contact resistance even when the cells are fastened with a smaller fastening force, whereby an improvement in power generation performance is achieved.

Next, a description will be given of the power generation performance of the fuel cell including the gas diffusion layer according to the present example.

Here, the fuel cell including the gas diffusion layer according to the present example is prepared as follows.

First, on both sides of the polymer electrolyte membrane (Nafion112, registered trademark: available from DuPont), a mixture of platinum-bearing carbon and an electrolyte solution is applied by spraying, and dried. The dried mixture serves as the catalyst layers.

Subsequently, the peeled surface of the gas diffusion layer according to the present example is brought into contact with the outer surface of the catalyst layer, and hot-pressed at a surface pressure of 1 kgf/cm$^2$, at a temperature of 120° C. Thus, the MEA was prepared.

Subsequently, on each of both the sides of the prepared MEA, a flat plate-like carbon plate (available from Tokai Carbon Co., Ltd.) having a thickness of 0.3 mm and a collector plate made of gold-plated brass are stacked in order, and the stacked product is fastened at a fastening force of 5 kgf/cm$^2$. Thus, the fuel cell including the gas diffusion layer according to the present example is prepared.

A power generation test was carried out by supplying the prepared fuel cell with a hydrogen gas as the fuel gas and with air as the oxidant gas, to obtain data shown in Table 2 below. Here, the power generation condition of the fuel cell is set as follows: cell temperature 75° C.; anode dew point and cathode dew point 60° C.; fuel gas utilization 70%; and oxidant gas utilization (Uo) 50%. Further, for the purpose of evaluating the gas diffusibility, measurement was carried out also for the voltage value and O$_2$ gain at oxidant gas utilization (Uo) of 90%. The O$_2$ gain shows the difference in voltage when the oxidant gas is converted from air to O$_2$ (oxygen). It shows that the smaller the O$_2$ gain is, the better the gas diffusibility is.

Further, as a comparative example, what was prepared was a fuel cell including: a conductive carbon sheet structuring the gas diffusion layer with no fluid flow passages; and separators made of carbon provided with the fluid flow passages. With such a fuel cell, a power generation test was conducted under the above-stated power generation condition. The result thereof also is shown in Table 2 as follows.

TABLE 2

| | voltage (V) | internal resistance (mΩ) | voltage at Uo 90% (V) | $O_2$ gain (mV) |
|---|---|---|---|---|
| Example | 0.710 | 7.8 | 0.695 | 89 |
| Comparative Example | 0.672 | 9.2 | 0.584 | 124 |

From Table 2, it can be seen that, the fuel cell gas diffusion layer according to the present example is higher in voltage and lower in internal resistance than the comparative example. Further, from Table 2, as to the voltage with Uo 90%, it can be seen that the fuel cell of the present example is higher in voltage than the fuel cell of the comparative example. Still further, from Table 2, it can be seen that the fuel cell of the present example is smaller in the $O_2$ gain than the fuel cell of the comparative example. Based on the foregoing result, it is verified that the fuel cell according to the example is lower in contact resistance and exhibits improved gas diffusibility, as compared to the fuel cell of the comparative example.

INDUSTRIAL APPLICABILITY

The fuel cell according to the present invention is capable of achieving a further improvement in power generation performance and suppressing a reduction in durability. Therefore, it is useful for a household cogeneration system, automobile-use fuel cell, a mobile equipment-use fuel cell, a backup-purpose fuel cell and the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese Patent Application No. 2009-236235 filed on Oct. 13, 2009 including specification, drawings, and claims are incorporated herein by reference in its entirety.

The invention claimed is:

1. A fuel cell, comprising:
a polymer electrolyte membrane having a catalyst layer, a gas diffusion layer, and a separator stacked in order on each of both surfaces of the polymer electrolyte membrane,
wherein
the gas diffusion layer provided at least on one surface side of the polymer electrolyte membrane is structured with a conductive carbon sheet, fluid flow passages being formed on a surface of the gas diffusion layer contacting on the separator, and
a roughness of the surface of the gas diffusion layer having the fluid flow passage formed is smaller than a roughness of a surface of the gas diffusion layer contacting on the catalyst layer,
wherein at least one of the gas diffusion layers has a rib portion positioned between adjacent fluid flow passages, and
wherein a difference in an arithmetic mean deviation of roughness profile between the surface of the gas diffusion layer contacting the separator and the surface of the gas diffusion layer contacting the catalyst layer is at least 1.0 μm and not more than 4.95 μm.

2. A fuel cell comprising:
a polymer electrolyte membrane having two surfaces; and
a catalyst layer, a gas diffusion layer, and a separator stacked in order on each of the two surfaces of the polymer electrolyte membrane,
wherein at least one of the gas diffusion layers is a conductive carbon sheet and has fluid flow passages formed on a surface of the gas diffusion layer contacting the respective separator, and
wherein a roughness of the surface of the gas diffusion layer having the fluid flow passages is smaller than a roughness of a surface of the gas diffusion layer contacting the catalyst layer,
wherein a difference in an arithmetic mean deviation of roughness profile between the surface of the gas diffusion layer contacting the separator and the surface of the gas diffusion layer contacting the catalyst layer is at least 1.0 μm and not more than 4.95 μm.

3. The fuel cell of claim 2, wherein said at least one of the gas diffusion layers has a rib portion positioned between adjacent fluid flow passages, and
wherein a density of a region below the rib portion is smaller than a density of a region below each of the fluid flow passages.

4. The fuel cell of claim 2, wherein the conductive carbon sheet is made of a fluorine-base resin and at least one of carbon black, graphite, expanded graphite, and carbon fibers.

5. The fuel cell of claim 4, wherein the fluorine-base resin is polytetrafluoroethylene.

6. A method of manufacturing of the fuel cell of claim 4, the method comprising:
disposing a stacked product including the conductive carbon sheet and a resin sheet between a pressing member and a receiving member, the pressing member having projecting portions conforming to a shape of the fluid flow passages;
pressing the stacked product with the pressing member and the receiving member to form the fluid flow passages at a surface of the conductive carbon sheet; and
peeling off the resin sheet from the conductive carbon sheet having the fluid flow passages formed.

* * * * *